(Model.)
A. B. WOOD.
Steam Governor.
No. 237,354.  Patented Feb. 1, 1881.
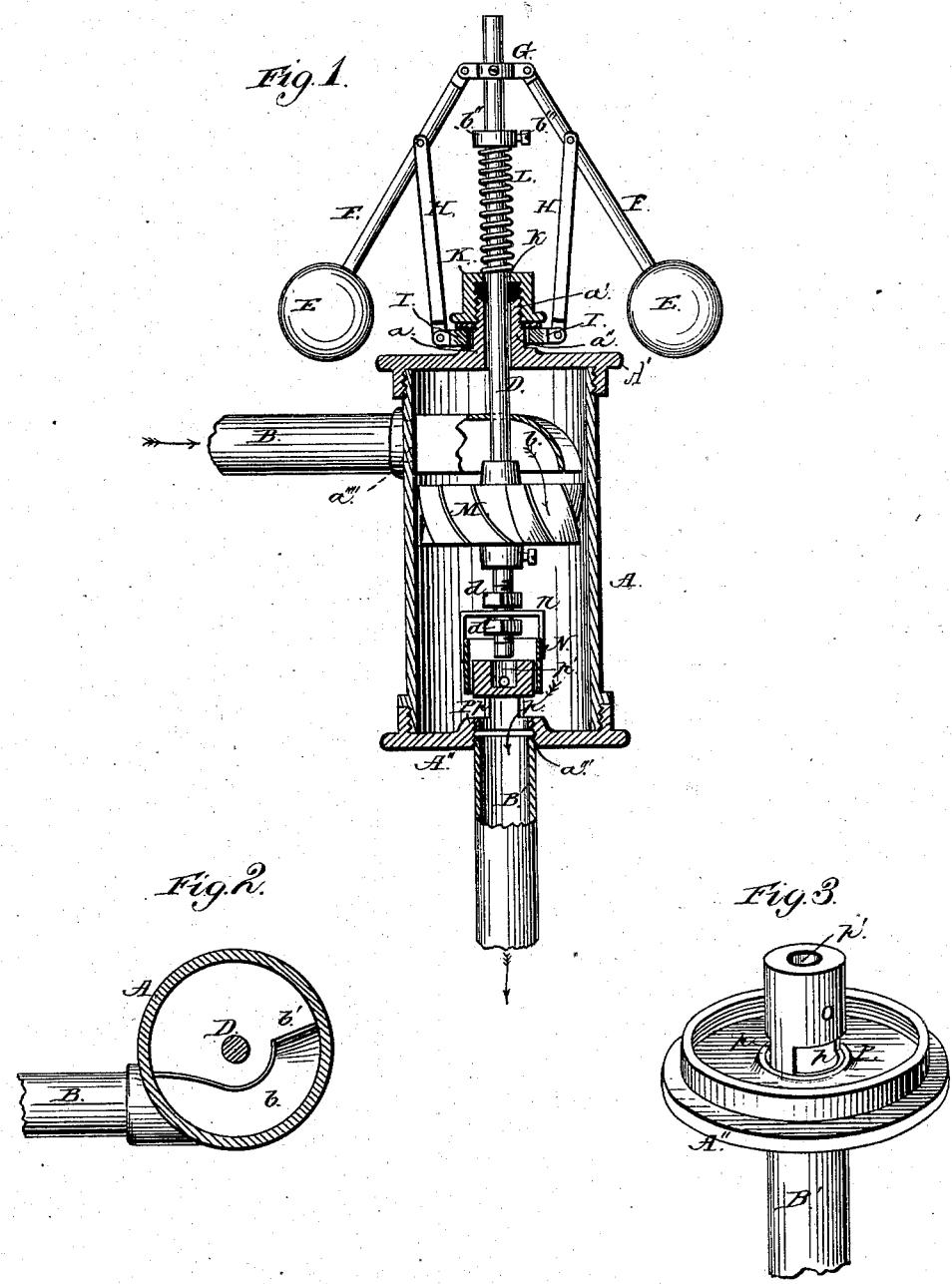
WITNESSES
Robert Everett
John A. Ellis
INVENTOR
Augustus B. Wood,
E. W. Anderson
By his Attorney

UNITED STATES PATENT OFFICE.

AUGUSTUS B. WOOD, OF HAMBURG, ARKANSAS, ASSIGNOR OF ONE-HALF TO MOSES ALEXANDER RICE, OF SAME PLACE.

STEAM-GOVERNOR.

SPECIFICATION forming part of Letters Patent No. 237,354, dated February 1, 1881.

Application filed October 2, 1880. (Model.)

*To all whom it may concern:*

Be it known that I, AUGUSTUS B. WOOD, of Hamburg, in the county of Ashley and State of Arkansas, have invented a new and valuable Improvement in Steam-Governors; and I do hereby declare that the following is a full, clear, and exact description of the construction and operation of the same, reference being had to the annexed drawings, making a part of this specification, and to the letters and figures of reference marked thereon.

Figure 1 of the drawings is a vertical section. Fig. 2 is a transverse section. Fig. 3 is a perspective detail.

This invention relates to steam-generators; and it consists in the device hereinafter described and claimed.

In the annexed drawings, A is the steam-box, having the screw-top A' with extension $a$, having screw-threaded end $a'$, and collar $a''$, and the screw-bottom A'', having threaded opening $a'''$. Within opening $a'''$ is secured the eductive-pipe B', and in opening $a''''$, to one side of the steam-box, is inserted the inductive-pipe B. This pipe B enters the cylinder and has its end, $b$, turned at right angles, so that the steam may leave the opening $b'$ at right angles to its path of entrance.

D is the ball-stem passing into the steam-box through the hole in the extension $a$ of top A'.

The balls E E are fastened, by their rods F F, to yoke G, made fast to stem D, and, by the rods H H, pivoted to rods F F at their upper ends, and at their lower ends to yoke I, which loosely fits collar $a''$.

Screwed upon extension $a$, at its end $a'$, is a cap, K, through whose hole $k$ the ball-stem passes. Upon the stem is made fast a collar, $b''$, by a set-screw, $b'''$.

Between cap K and collar $b''$ is a spring, L, whose tension is varied by moving the collar up and down, by which means the flow of steam and the speed of the balls are varied.

Just below the opening $b'$ of the induction pipe B there is a wheel, M, constructed like a turbine, said wheel being either affixed to stem D or having a sleeve through which said stem slides.

Attached to the bottom of the stem D, by the nuts $d\ d'$, is a balance-valve, N, having handle $n$, between said nuts and through which the stem passes.

Bottom A'' has projecting upward the valve-seat P, in which are formed ports, $p\ p$, and a recess, $p'$, to fit the end of stem D.

The spring L is adjusted for the required flow of steam, and the latter is admitted through pipe B, passing out of opening $b'$ and falling upon the wheel M, and causing it and the stem D to revolve. This causes the balls E E to fly off from the center, thereby lowering the stem D, and tending to close the ports $p\ p$. This partial closing tends to check the flow of steam and, consequently, the revolution of the wheel and stem, and the balls fall back until they assume a position commensurate with the desired speed, by which construction and operation the amount of steam passing through ports $p\ p$ is supplied as required.

What I claim is—

1. The combination of the steam-box A, the induction-pipe B, having opening $b'$, wheel M, ball-stem D, valve N, valve-seat P, and eduction-pipe B'.

2. The combination of the steam-box A, having top A', with threaded extension $a$, and bottom A'', having threaded opening $a'''$, and valve-seat P, cap K, spring L, collar $b''$, yoke I, rods H H F F, balls E E, wheel M, and valve N.

In testimony that I claim the above I have hereunto subscribed my name in the presence of two witnesses.

AUGUSTUS BALDWIN WOOD.

Witnesses:
W. W. WOOD,
M. A. RICE.